(12) United States Patent
Yang et al.

(10) Patent No.: US 10,421,444 B2
(45) Date of Patent: Sep. 24, 2019

(54) BRAKE SYSTEM

(71) Applicant: MANDO CORPORATION, Gyeonggi-do (KR)

(72) Inventors: I-Jin Yang, Gyeonggi-do (KR); Young-Chae Her, Incheon (KR)

(73) Assignee: MANDO CORPORATION, Gyeonggi-Do (KR)

( * ) Notice: Subject to any disclaimer, the term of this patent is extended or adjusted under 35 U.S.C. 154(b) by 143 days.

(21) Appl. No.: 15/407,206

(22) Filed: Jan. 16, 2017

(65) Prior Publication Data
US 2017/0217416 A1 Aug. 3, 2017

(30) Foreign Application Priority Data
Jan. 29, 2016 (KR) .................. 10-2016-0011719

(51) Int. Cl.
*B60T 13/16* (2006.01)
*B60T 17/00* (2006.01)
*F15B 1/02* (2006.01)
*B60T 8/40* (2006.01)
*F15B 21/00* (2006.01)
(Continued)

(52) U.S. Cl.
CPC .......... *B60T 13/168* (2013.01); *B60T 8/4068* (2013.01); *B60T 17/00* (2013.01); *F15B 1/021* (2013.01); *F15B 21/008* (2013.01); *B60T 8/368* (2013.01); *B60T 8/4872* (2013.01); *F16L 55/04* (2013.01)

(58) Field of Classification Search
CPC ...... B60T 13/14; B60T 13/148; B60T 13/168; B60T 17/00; F16L 55/04; F15B 1/021
See application file for complete search history.

(56) References Cited

U.S. PATENT DOCUMENTS 6,146,336 A  11/2000 Paulat
6,164,336 A * 12/2000 Pasquet ............... B60T 8/4068
                                                138/26
(Continued)

FOREIGN PATENT DOCUMENTS

CN          104709255      6/2015
JP            5-170077      7/1993
KR      10-2013-0096452    8/2013

OTHER PUBLICATIONS

Office Action dated Nov. 2, 2018 for Chinese Patent Application No. 201710061772.X and its English machine translation by Global Dossier.

*Primary Examiner* — Vishal R Sahni
(74) *Attorney, Agent, or Firm* — Ladas & Parry, LLP (57) ABSTRACT

Disclosed is a brake system. The brake system includes a pulsation attenuation device configured to attenuate pressure pulsation of brake oil discharged from a pump, wherein the pulsation attenuation device includes a first damping device, wherein the first damping device includes: a first damping member inserted into a first bore in communication with an in-port through which brake oil is introduced and an out-port through which brake oil is discharged and having a hollow formed therein; a second damping member inserted into the hollow to form a damping space between the second damping member and an inner circumferential surface of the first damping member; and a sealing member coupled to the first damping member and configured to seal the first bore, wherein the damping space is formed by a plurality of grooves formed in the hollow.

16 Claims, 9 Drawing Sheets

(51) Int. Cl.
*F16L 55/04* (2006.01)
*B60T 8/36* (2006.01)
*B60T 8/48* (2006.01)

(56) References Cited

U.S. PATENT DOCUMENTS

| | | | | |
|---|---|---|---|---|
| 6,439,266 B1* | 8/2002 | Xu | ............ | F16L 55/04 |
| | | | | 138/26 |
| 2011/0049970 A1* | 3/2011 | Hironaka | ............ | B60T 7/042 |
| | | | | 303/6.01 |
| 2012/0133201 A1* | 5/2012 | Zeoli | ............ | B60T 7/22 |
| | | | | 303/11 |
| 2013/0062933 A1* | 3/2013 | Daher | ............ | B60T 7/042 |
| | | | | 303/10 |
| 2013/0269816 A1* | 10/2013 | Lee | ............ | B60T 17/04 |
| | | | | 138/31 |
| 2015/0337868 A1* | 11/2015 | Hashida | ............ | F15B 1/04 |
| | | | | 138/30 |
| 2015/0360662 A1* | 12/2015 | Doh | ............ | B60T 13/148 |
| | | | | 303/87 |
| 2016/0001754 A1* | 1/2016 | Kim | ............ | B60T 8/4068 |
| | | | | 303/87 |
| 2017/0057478 A1* | 3/2017 | Her | ............ | B60T 8/4068 |

\* cited by examiner

BRAKE SYSTEM

CROSS-REFERENCE TO RELATED APPLICATION

This application claims the benefit of Korean Patent Application No. 2016-0011719, filed on Jan. 29, 2016 in the Korean Intellectual Property Office, the disclosure of which is incorporated herein by reference.

BACKGROUND

1. Field

Embodiments of the present disclosure relate to a brake system, and more particularly, to a brake system which improves pressure boosting performance in high pressure control as well as attenuating pressure pulsation of brake oil discharged from a pump.

2. Description of the Related Art

In general, a brake system, in which a plurality of solenoid valves, a low pressure accumulator configured to store oil, a pump disposed to be connected to an outlet of the low pressure accumulator to pump oil stored in the low pressure accumulator, and a motor configured to drive the pump are installed in a modulator block to control hydraulic braking pressure transmitted to a brake of a vehicle, includes an electronic control unit (ECU) configured to control electrically operating components.

Such a brake system employs and uses various structures provided with a pulsation attenuation device having a predetermined damping space, an orifice provided at an out-port through which oil is discharged, and the like to attenuate pressure pulsation which is generated when hydraulic pressure of brake oil discharged from the pump is high. For example, a known pulsation attenuation device includes a damping space, a spring provided in the damping space, a piston elastically supported by the spring, a sealing member configured to seal the damping space from the outside to attenuate pressure pulsation generated according to a pressure transmitted from the pump.

However, although a damping device has to be designed on the basis of a discharged flow rate to attenuate pressure pulsation that occurs due to an abrupt change of a flow rate due to an operation in which oil is discharged or suctioned through a pumping operation of a pump, the pulsation attenuation device provided in a conventional brake system is simply configured to attenuate a first pressure pulsation, and thus there is a problem in that an efficient pressure pulsation attenuation effect is not obtained.

SUMMARY

Therefore, it is an aspect of the present disclosure to provide a brake system in which pressure pulsation generated by a change in an amount and a flow rate of oil discharged from a pump are minimized by improving a structure of a pulsation attenuation device, flow loss is minimized by changing the discharge flow rate of the oil according to low pressure control or high pressure control, and pressure boosting performance is improved.

Additional aspects of the disclosure will be set forth in part in the description which follows and, in part, will be obvious from the description or may be learned by practice of the disclosure.

In accordance with one aspect of the present disclosure, a brake system comprising a pulsation attenuation device configured to attenuate pressure pulsation of brake oil discharged from a pump, wherein the pulsation attenuation device includes a first damping device, wherein the first damping device includes: a first damping member inserted into a first bore in communication with an in-port through which brake oil is introduced and an out-port through which brake oil is discharged and having a hollow formed therein; a second damping member inserted into the hollow to form a damping space between the second damping member and an inner circumferential surface of the first damping member; and a sealing member coupled to the first damping member and configured to seal the first bore, wherein the damping space is formed by a plurality of grooves formed in the hollow.

Further comprising a sleeve configured to cover the first damping member and coupled to the sealing member by press-fitting, wherein a plurality of holes are formed in an outer circumferential surface of the sleeve so that the first damping member is pressurized by the brake oil.

A coupler having a step is formed at an upper end of the first damping member; and an end step fitted to the coupler is formed at the sealing member to be coupled to the coupler by press-fitting.

A stopper is formed to extend from a lower end of the sealing member to be inserted into the hollow; and the stopper is provided to be spaced a predetermined distance from the second damping member to limit a deformation range of the second damping member.

The first damping member is formed of a rubber material to be elastically deformable.

The second damping member is formed with a leaf spring to be elastically deformable and is rolled to be positioned in the hollow, and both ends of the second damping member overlap each other.

The plurality of grooves are formed in a longitudinal direction of the first damping member and spaced a predetermined distance from each other in an inner circumferential surface of the first damping member or formed in a circumferential direction of the first damping member and spaced a predetermined distance from each other in a longitudinal direction of the first damping member. In accordance with another aspect of the present disclosure, a brake system comprising a pulsation attenuation device configured to attenuate pressure pulsation of brake oil discharged from a pump, wherein the pulsation attenuation device includes a second damping device installed in a second bore in communication with an in-port through which brake oil is introduced and an out-port through which brake oil is discharged, wherein the second damping device includes: a cap member configured to seal the second bore and including an inlet through which brake oil is introduced and an accommodation portion in communication with the inlet formed therein; a plunger formed to be slidable in the accommodation portion; an elastic member configured to elastically support the plunger; and a housing configured to support a lower end of the elastic member and coupled to the cap member, wherein a slot in which a width thereof varies in a direction in which brake oil flows is formed in an outer circumferential surface of the plunger, and thus a variable path is formed between the plunger and the accommodation portion.

The variable path is formed such that an area thereof through which the brake oil passes is decreased in a direction in which brake oil is discharged.

When a hydraulic pressure of brake oil introduced through the inlet is a predetermined pressure or more, the plunger is provided to move while pressing the elastic member, and an area through which brake oil flow varies according to the movement of the plunger.

The plunger has a shape corresponding to the accommodation portion and is guided by the accommodation portion to be moved.

The accommodation portion is formed by opening a lower portion of the cap member, and the inlet is formed around the cap member to communicate with the accommodation portion.

The inlet is positioned above the housing.

A discharging port through which brake oil discharged through the variable path is discharged is formed in the housing.

In accordance with another aspect of the present disclosure, a brake system comprising a pulsation attenuation device configured to attenuate pressure pulsation of brake oil discharged from a pump, wherein the pulsation attenuation device includes: a first damping device having: a first damping member inserted into a first bore configured to communicate with an in-port through which brake oil is introduced and an out-port through which brake oil is discharged and including a hollow in which a plurality of grooves are formed; a second damping member inserted into the hollow so that the plurality of grooves of the first damping member are formed as a damping space; a sealing member coupled to the first damping member and configured to seal the first bore; and a sleeve including a plurality of holes formed in an outer circumferential surface thereof, configured to cover the first damping member, and coupled to the sealing member by press-fitting so that the first damping member is pressurized by the brake oil; and a second damping device having: a cap member configured to seal a second bore in communication with the out-port and having an inlet through which brake oil is introduced from the first damping device and an accommodation portion in communication with the inlet; a plunger installed to be slidable in the accommodation portion; an elastic member configured to elastically support the plunger; and a housing configured to support a lower end of the elastic member and coupled to the cap member, wherein a slot in which a width thereof varies in a direction in which brake oil flows is formed in an outer circumferential surface of the plunger, and thus a variable path is formed between the plunger and the accommodation portion, wherein the variable path attenuates pressure pulsation of the brake oil introduced through the first damping device and controls a passing flow rate according to a pressure of the brake oil.

BRIEF DESCRIPTION OF THE DRAWINGS

Although embodiments of the present disclosure will be described in detail with reference to the accompanying drawings, the embodiments should not be interpreted by only the drawings because the drawings illustrate exemplary embodiments of the present disclosure.

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The embodiments are provided in order to fully explain the spirit and scope of the present disclosure to those skilled in the art. Thus, the present disclosure is not to be construed as being limited to the embodiments set forth herein and may be accomplished in other various embodiments. Parts irrelevant to the description will be omitted in the drawings in order to clearly explain the present disclosure. Sizes of elements in the drawings may be exaggerated in order to facilitate understanding.

Figure 1:
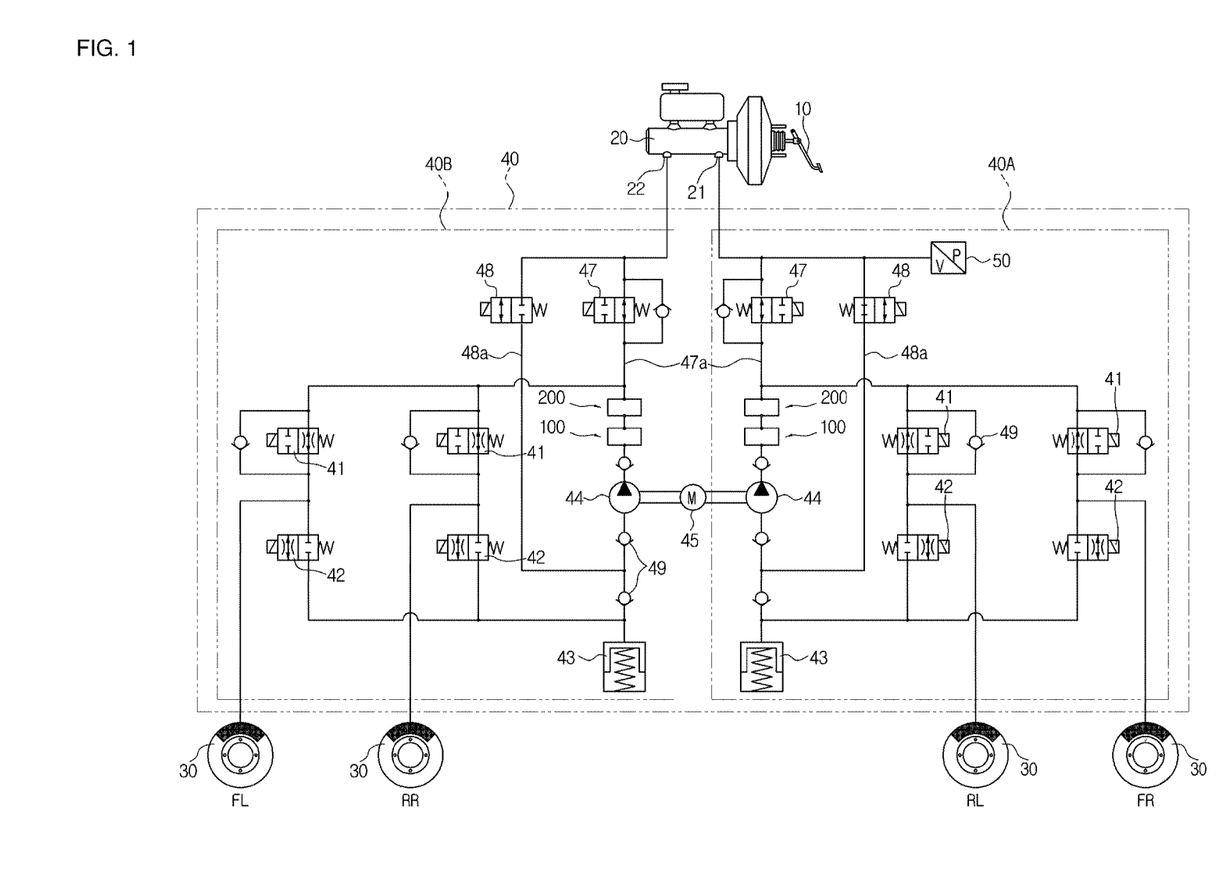
FIG. 1 is a schematic view illustrating a hydraulic circuit diagram of a brake system according to one embodiment of the present disclosure.

FIG. 1 is a schematic view illustrating a hydraulic circuit diagram of a brake system according to one embodiment of the present disclosure.

Referring to FIG. 1, the brake system includes a brake pedal 10 configured to receive an operation force of a user, a brake booster 11 configured to increase braking effort using a difference between vacuum pressure and atmospheric pressure due to the braking effort of the brake pedal 10, a master cylinder 20 configured to generate pressure using the brake booster 11, a first hydraulic circuit 40A in which a first port 21 of the master cylinder 20 is connected to wheel cylinders 30 provided at two wheels FR and RL and which control transmission of hydraulic pressure, and a second hydraulic circuit 40B in which a second port 22 of the master cylinder 20 is connected to wheel cylinders 30 provided at two wheels FL and RR, and which controls transmission of hydraulic pressure. The first hydraulic circuit 40A and the second hydraulic circuit 40B are compactly installed in a modulator block 40.

The first hydraulic circuit 40A and the second hydraulic circuit 40B each include solenoid valves 41 and 42 configured to control hydraulic braking pressure transmitted to the two wheel cylinders 30, a pump 44 configured to suction and pump brake oil discharged from the wheel cylinders 30 or discharged from the master cylinder 20 by a motor 45, a low pressure accumulator 43 configured to temporarily store the brake oil discharged from the wheel cylinders 30, a main path 47a configured to connect an outlet of the pump 44 to the master cylinder 20, an auxiliary path 48a configured to guide the brake oil of the master cylinder 20 to be suctioned through an entrance of the pump 44, and an electronic control unit ECU (not shown) configured to control driving of the plurality of solenoid valves 41 and 42 and the motor 45.

Here, as illustrated in the drawing, the solenoid valves 41 and 42, the low pressure accumulator 43, the pump 44, the main path 47a, and the auxiliary path 48a are provided in each of the first and second hydraulic circuits 40A and 40B.

More specifically, the plurality of solenoid valves 41 and 42 are related to upstream and downstream of the wheel cylinders 30 and are divided into a normally open solenoid valve 41 which is disposed upstream of the wheel cylinder 30 and normally maintains an open state and a normally closed solenoid valve 42 which is disposed downstream of the wheel cylinder 30 and normally maintains a closed state. Opening and closing operation of the solenoid valves 41 and 42 may be controlled by the ECU (not shown), and brake oil, which is discharged from the wheel cylinders 30 as the normally closed solenoid valve 42 is opened according to decompression braking, is temporarily stored in the low pressure accumulator 43.

The pump 44 is driven by the motor 45 to suction and discharge brake oil stored in the low pressure accumulator 43 in order to transmit hydraulic pressure to the wheel cylinders 30 or the master cylinder 20.

In addition, a normally open solenoid valve (hereinafter, a TC valve) 47 for traction control (TCS) is installed on the main path 47a which connects the master cylinder 20 to the outlet of the pump 44. The TC valve 47 normally maintains an open state to transmit hydraulic braking pressure generated by the master cylinder 20 to the wheel cylinders 30 through the main path 47a during general braking using the brake pedal 10.

In addition, the auxiliary path 48a is branched from the main path 47a to guide brake oil of the master cylinder 20 to be suctioned through the entrance of the pump 44, and a shuttle valve 48 is formed on the auxiliary path 48a to allow the brake oil to flow only through the entrance of the pump 44. The electrically operating shuttle valve 48 is installed in the middle of the auxiliary path 48a to be normally closed and to be closed in TCS mode.

Meanwhile, a reference numeral '49', which is not described, denotes a check valve installed at a suitable position on the path to prevent backflow of brake oil, and a reference numeral '50' denotes a pressure sensor configured to detect braking pressure transmitted to the TC valve 47 and the shuttle valve 48.

The brake system described above generates pressure pulsation due to a pressure of a liquid pumped by the pump 44 according to an operation of the motor 45 during braking, and thus, a pulsation attenuation device according to one embodiment of the present disclosure, which is connected to an outlet end of the pump 44 of each of the hydraulic circuits 40A and 40B to attenuate pressure pulsation, is provided.

Figure 2:
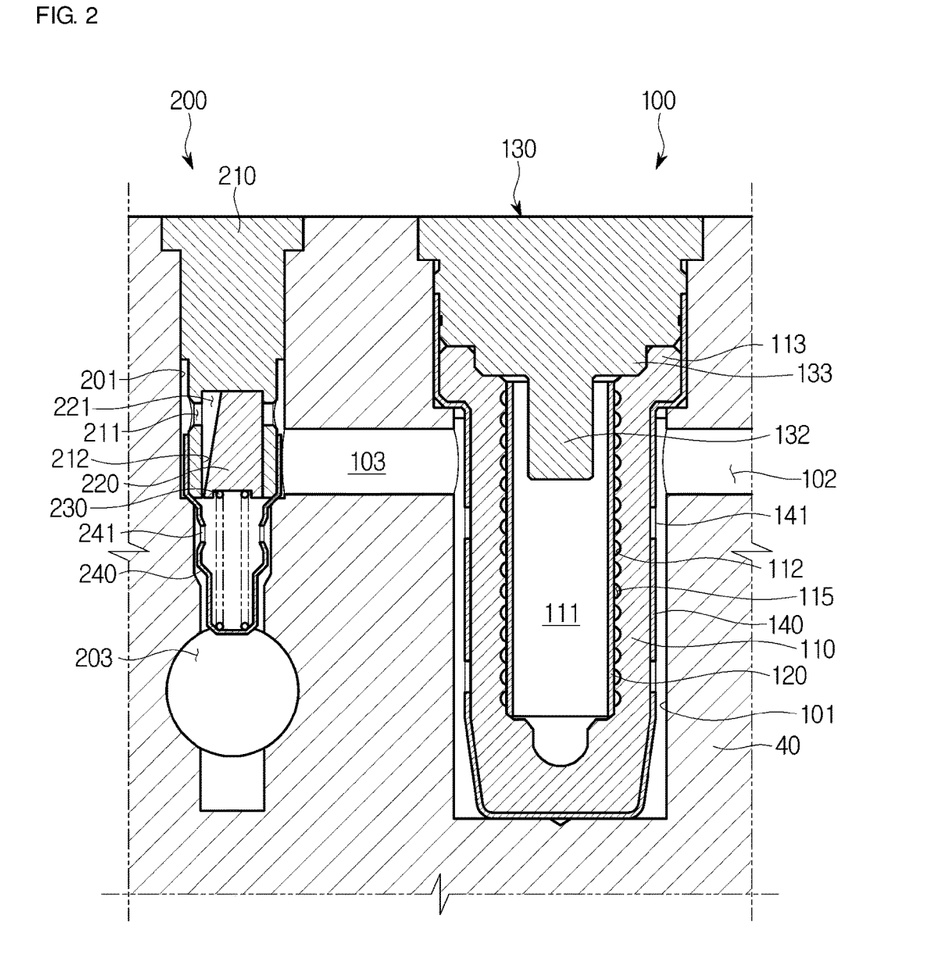
FIG. 2 is a cross-sectional view illustrating a pulsation attenuation device in the brake system according to one embodiment of the present disclosure.
Figure 3:
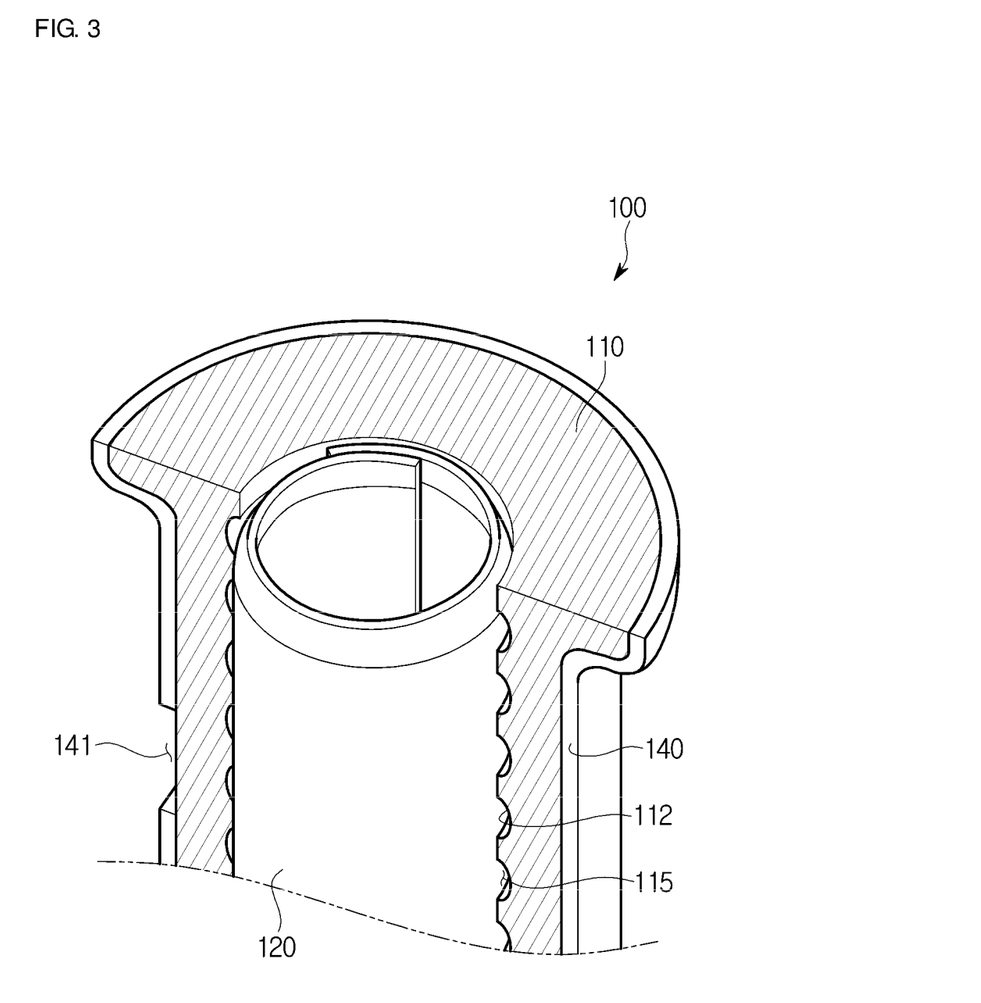
FIG. 3 is a partially cut-away perspective view illustrating a second damping member provided in a first damping device of the pulsation attenuation device according to one embodiment of the present disclosure.

FIG. 2 is a cross-sectional view illustrating the pulsation attenuation device in the brake system according to one embodiment of the present disclosure, and FIG. 3 is a partially cut-away perspective view illustrating a second damping member which is provided in a first damping device of the pulsation attenuation device.

Referring to FIGS. 2 and 3, the pulsation attenuation device according to one embodiment of the present disclosure includes a first damping device 100 configured to attenuate pressure pulsation of brake oil discharged by the pump 44 and a second damping device 200 provided to be spaced apart from the first damping device 100. As illustrated, the first damping device 100 and the second damping device 200 are provided in a state of being respectively installed in bores 101 and 201 connected with each other through a path to control a passing flow rate according to a pressure of brake oil, as well as attenuate pressure pulsation. For example, a discharging flow rate may be changed according to low pressure control and high pressure control to minimize flow loss, and thus pressure boosting performance can be improved. Hereinafter, the first damping device 100 of the pulsation attenuation device will be described first.

The first damping device 100 is provided in the first bore 101 which communicates with an in-port 102 through which brake oil discharged by the pump 44 (see FIG. 1) and an out-port 103 through which brake oil is discharged. Here, as the first and second damping devices 100 and 200, which are provided on the main path 47a (see FIG. 1), are connected to the main path 47a connected to the master cylinder 20, the in-port 102 is connected to the main path 47a connected to the outlet end of pump 44 and the out-port 103 is connected to the second damping device 200 which will be described below.

The first damping device 100 includes a first damping member 110 provided by being inserted into the first bore 101, a second damping member 120 provided in the first damping member 110, a sealing member 130 coupled to the first damping member 110 to seal an opening of the first bore 101 having one open side, and a sleeve 140 configured to cover the first damping member 110 and coupled to the sealing member 130.

The first damping member 110, which has a cylindrical shape having one open side and a hollow 111 formed therein, is inserted into the first bore 101. More specifically, the damping member 110 is inserted into the first bore 101 such that a circumferential surface thereof is spaced a predetermined distance from the first bore 101. Here, the reason why the first damping member 110 is installed to be spaced the predetermined distance from the first bore 101 is to discharge brake oil introduced through the in-port 102 into the first bore 101 through the out-port 103.

In addition, a plurality of grooves 112, which are concavely recessed from the hollow 111, are formed in an inner circumferential surface of the first damping member 110. Here, a damping space 115 is formed in the first damping member 110, and the damping space 115 is formed by the second damping member 120 inserted into the hollow 111 of the first damping member 110 and the plurality of grooves 112. At this point, a coupling structure of the first damping member 110 and the second damping member 120 which will be described below and a function of the damping space 115 formed by the coupling structure will be described below again.

Although the plurality of grooves 112 are illustrated to be spaced a predetermined distance from each other in the inner circumferential surface of the first damping member 110 in a longitudinal direction and a circumferential direction of the first damping member 110, the plurality of grooves 112 are not limited thereto, and may also be formed to be spaced a predetermined distance from each other in the inner circumferential surface in a longitudinal direction of the first damping member 110. In addition, the number of grooves 112 may be selectively increased or decreased.

The first damping member 110 may be formed of a rubber material that is elastically deformable to perform a buffering action when high pressure brake oil is introduced into the first damping member 110.

The second damping member 120 is inserted into the hollow 111 of the first damping member 110 to serve a role of further attenuating pressure pulsation. The second damping member 120 is provided with a leaf spring 120 to be elastically deformable. More specifically, the second damping member 120 provided with the leaf spring is rolled up to have a cylindrical shape and positioned in the hollow 111. Here, the leaf spring 120 is rolled such that both ends thereof overlap each other to be elastically deformed inward when pressure is applied from the outside. Since the second damping member 120 is inserted into the hollow 111, the damping space 115 is formed in the first damping member 110. That is, since an outer circumferential surface of the second damping member 120 is pressed against the inner circumferential surface of the first damping member 110, the plurality of grooves 112 formed inside the hollow 111 are provided as the damping space 115. Accordingly, the first damping member 110 may be easily elastically deformed by the damping space 115 when pressurized and elastically deformed, and thus pressure pulsation is attenuated. In addition, when an amount of elastic deformation of the first damping member 110 is increased more than or equal to a predetermined amount, since the second damping member 120 is pressurized and deformed by the first damping member 110, the pressure pulsation is further attenuated.

The sealing member 130 is installed to be coupled to the first damping member 110 in order to seal one open end of the first bore 101. An end step 133, which is stepped and configured to be coupled to the first damping member 110, is formed at a lower portion of the sealing member 130. Accordingly, a coupler 113, which is stepped and configured to be fitted to the end step 133, is formed at an upper end of the first damping member 110, and thus the end step 133 is coupled to the coupler 113 by press-fitting.

In addition, a stopper 132, which extends to be inserted into the hollow 111, is formed at a middle lower end of the sealing member 130. The stopper 132 is provided to be spaced a predetermined distance from the second damping member 120 to serve a role of limiting a deformation range of the second damping member 120.

The sleeve 140 covers the first damping member 110 and is coupled to the sealing member 130 by press-fitting. Here, a plurality of holes 141 are formed in an outer circumferential surface of the sleeve 140. The plurality of holes 141 are formed so that the first damping member 110 is directly pressed by brake oil, and positions and the number thereof may be selectively changed. Since the sleeve 140 covers the first damping member 110 and is coupled to the sealing member 130, the first damping device 100 may be provided as a single assembly. Accordingly, the first damping device 100 may be easily installed in the first bore 101. In addition, since the sleeve 140 is coupled to the first bore 101 along with the sealing member 130, brake oil is prevented from being leaked to the outside, and the brake oil is also prevented from being introduced between the sealing member 130 and the first damping member 110.

Next, the second damping device 200 of the pulsation attenuation device according to one aspect of the present disclosure will be described.

The second damping device 200 is installed in the second bore 201 in communication with the out-port 103 to serve a role of attenuating pressure pulsation of brake oil introduced through the first damping device 100. Here, an outlet 203 of the second bore 201 in which the second damping device 200 is installed is connected to the main path 47a (see FIG. 1) connected to the master cylinder 20.

The second damping device 200 includes a cap member 210 configured to seal the second bore 201, a plunger 220 guided by the cap member 210 and configured to move in a sliding manner, an elastic member 230 configured to elastically support the plunger 220, and a housing 240 configured to support the elastic member 230 and coupled to the cap member 210.

The cap member 210 is installed to seal one open end of the second bore 201. An inlet 211 through which brake oil is introduced and an accommodation portion 212 in communication with the inlet 211 are formed in the cap member 210. According to the drawings, the accommodation portion 212 is provided by opening a lower portion of the cap member 210, and the inlet 211 is formed around the cap member 210 at a position in which the accommodation portion 212 is formed. Accordingly, the accommodation portion 212 is preferably formed at a position corresponding to a position at which the out-port 103 is formed so that brake oil is easily introduced through the inlet 211. In addition, the inlet 211 is formed to be positioned above the housing 240 because the housing 240, which will be described below, is coupled below the cap member 210 by press-fitting. The plunger 220 is movably provided in the accommodation portion 212.

The plunger 220 is supported by the elastic member 230 and provided to be slidable in the accommodation portion 212. The plunger 220 has a shape corresponding to the accommodation portion 212 and moves by being guided by the accommodation portion 212. The plunger 220 moves while being pressurized by a hydraulic pressure of brake oil introduced from first damping device 100 to press the elastic member 230. A slot 221 is formed at an outer circumferential surface of the plunger 220 in a longitudinal direction of the plunger 220. That is, the slot 221 is formed in a flowing direction of brake oil. Here, a width of the slot 221 varies to decrease in a direction in which brake oil is discharged. The slot 221 is formed to serve as an orifice configured to attenuate pressure pulsation of brake oil and guide a flow and is formed as a variable path 221 between the plunger 220 and the accommodation portion 212. Accordingly, when the plunger 220 presses the elastic member 230 and moves downward, an area of the variable path 221, through which brake oil passes, increases.

The elastic member 230 is provided as a spring 230 having a coil shape to provide elastic force to the plunger 220. An upper end of the elastic member 230 is supported by a lower end of the plunger 220, and a lower end of the elastic member 230 is supported by the housing 240 which will be described below.

The housing 240 supports the lower end of the elastic member 230 and is coupled to the cap member 210. A discharging port 241 is formed at the housing 240 to discharge brake oil discharged through the variable path 221. The discharging port 241 is provided around the housing 240, and the brake oil discharged through the discharging port 241 is discharged through the outlet 203 formed at the second bore 201. Since the housing 240 covers and is coupled to the lower portion of the cap member 210, the second damping device 200 may be provided as a single assembly. Accordingly, the second damping device 200 may be easily installed in the second bore 201.

Figure 6:
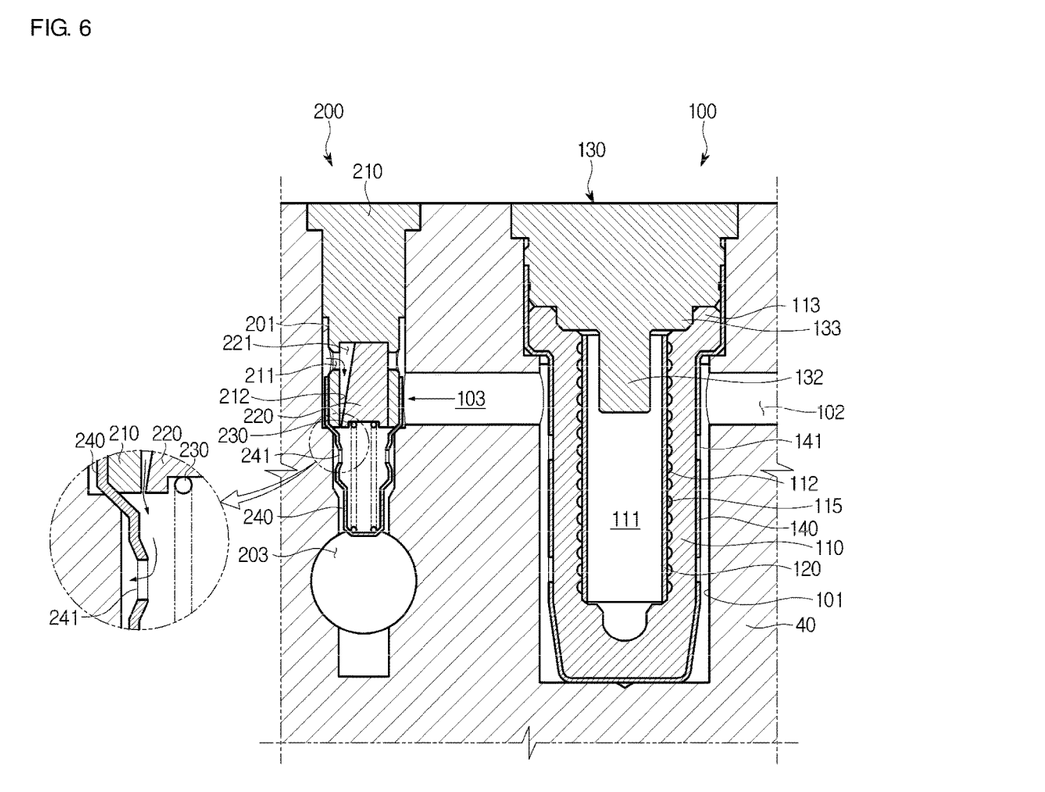
FIG. 6 is a cross-sectional view illustrating a state in which pressure pulsation is attenuated by a second damping device of the pulsation attenuation device according to one embodiment of the present disclosure.

In the above-described second damping device 200, the plunger 220 is provided to move while pressing the elastic member 230 when hydraulic pressure of brake oil is a predetermined pressure or more. For example, as illustrated in FIG. 6, in the second damping device 200, when a pressure of brake oil introduced from the first damping device 100 is low, the plunger 220 does not move, and the brake oil is discharged toward the discharging port 241 of the housing 240 through variable path 221 while pressure pulsation is attenuated. Here, the predetermined pressure of the brake oil may be understood to be proportional to an elastic force of the elastic member 230, and when the pressure of the brake oil is less than the elastic force of the elastic member 230, the predetermined pressure of the brake oil may also be understood as a low pressure.

Figure 7:
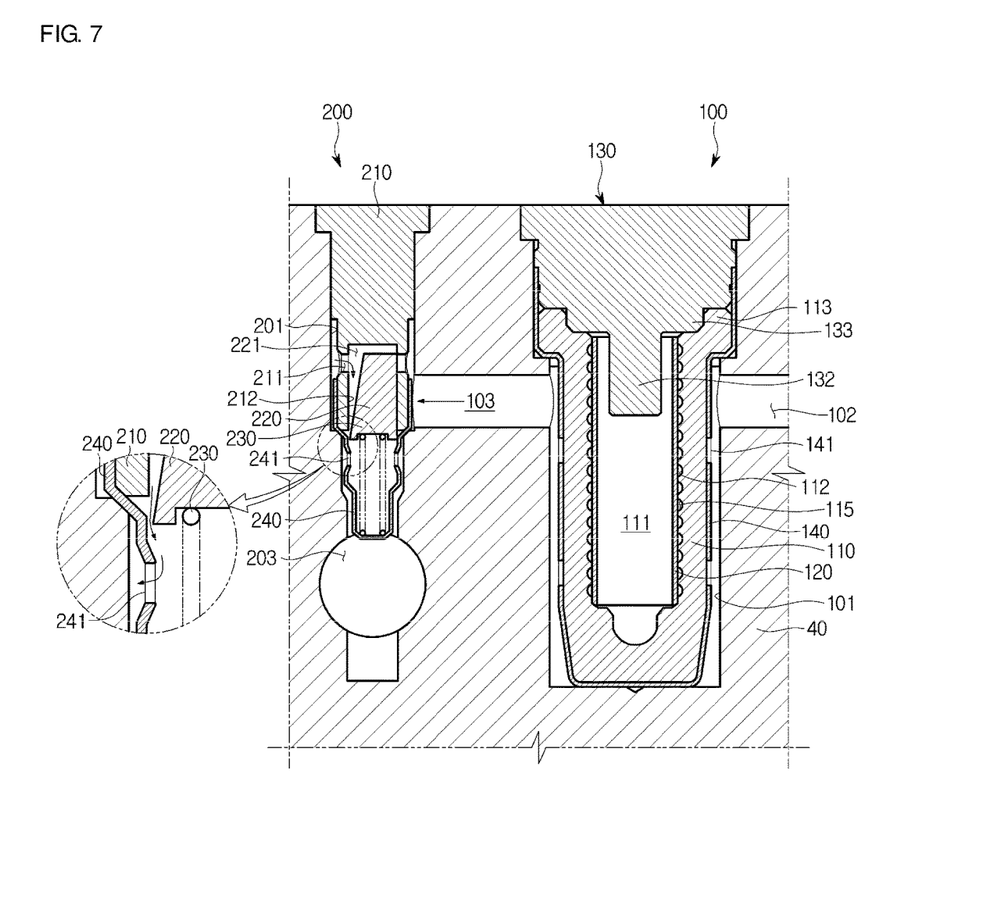
FIG. 7 is a cross-sectional view illustrating a state in which pressure pulsation is attenuated by the second damping device of the pulsation attenuation device and a discharging flow rate is changed by a variable path according to one embodiment of the present disclosure.

Meanwhile, when a pressure of brake oil is greater than an elastic force of the elastic member 230, since the plunger 220 compresses the elastic member 230 and moves in a sliding manner as illustrated in FIG. 7, a volume of the elastic member 230 is changed, and thus pressure pulsation is attenuated. At this moment, an area through which the brake oil passes is increased by the movement of the plunger 220, wherein the brake oil passes through the variable path 221 formed between the plunger 220 and the accommodation portion 212.

Figure 8:
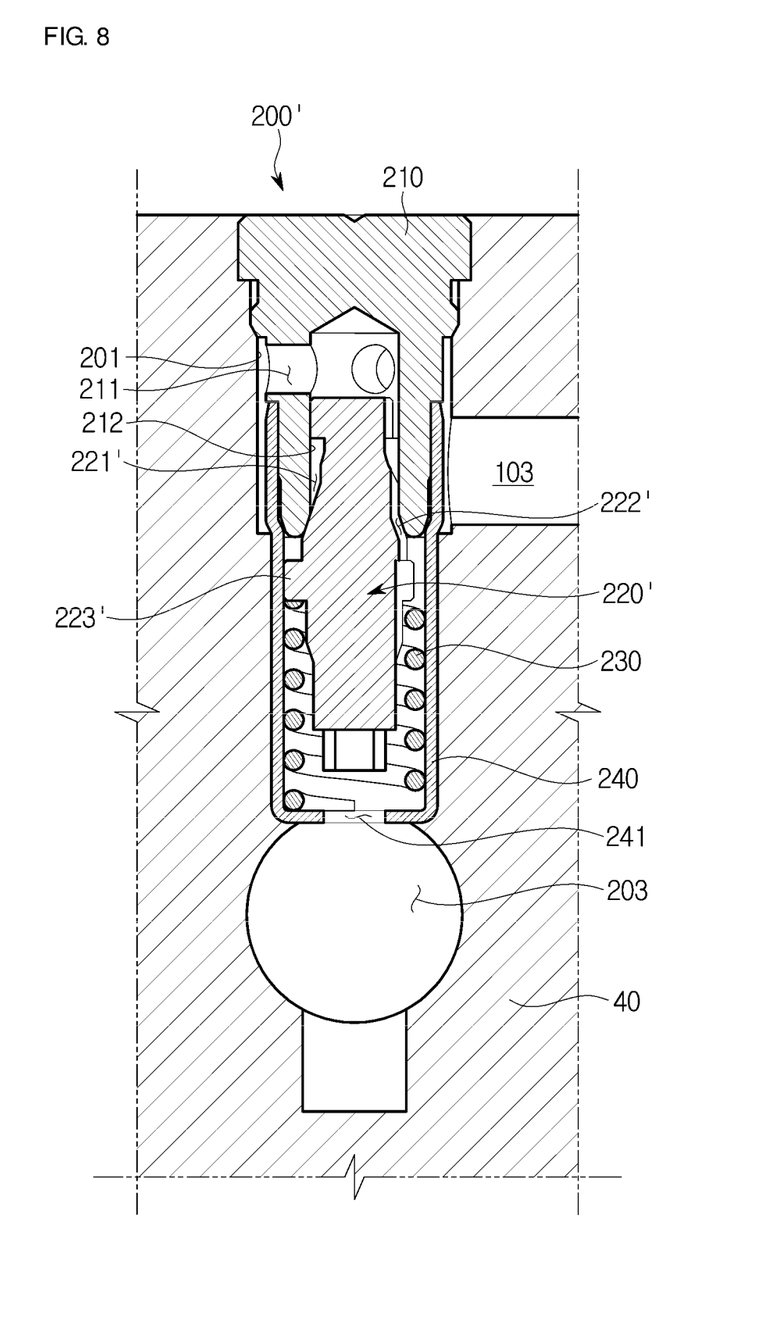
FIG. 8 is a cross-sectional view illustrating a second damping device of a pulsation attenuation device according to another embodiment of the present disclosure.
Figure 9:
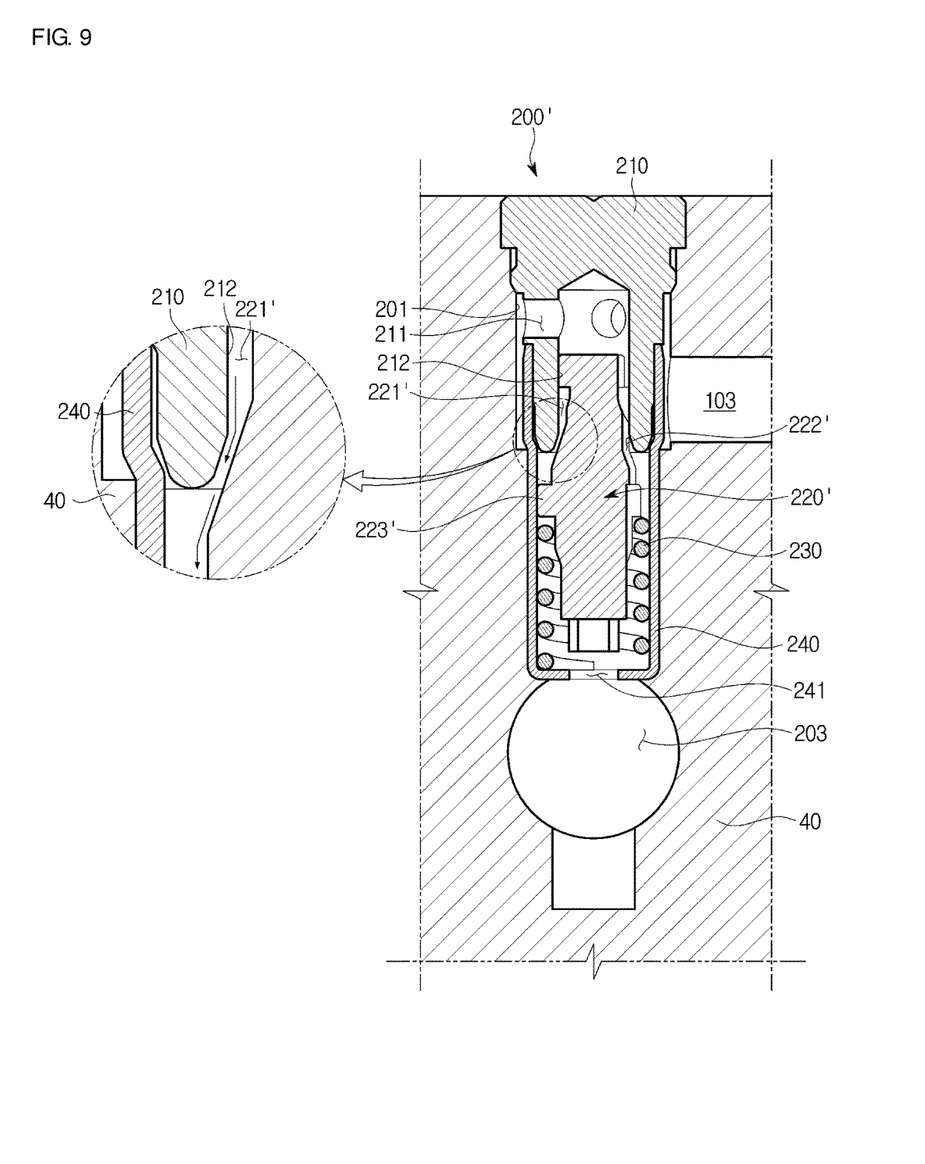
FIG. 9 is a cross-sectional view illustrating a state in which pressure pulsation is attenuated by the second damping device of a pulsation attenuation device and a discharging flow rate is changed by a variable path according to another embodiment of the present disclosure.

Although the plunger 220 of the second damping device 200 according to one aspect of the present disclosure is shown and explained to be formed to have a shape corresponding to the accommodation portion 212 of the cap member 210, the plunger 220 is not limited thereto, and the plunger 220 may have any shape as long as the variable path 221 is formed in a flowing direction of brake oil, the plunger 220 may have any shape. For example, an embodiment in which a shape of a plunger 220 is changed is illustrated in FIGS. 8 and 9. FIG. 8 is a cross-sectional view illustrating a second damping device of a pulsation attenuation device according to another embodiment of the present disclosure, and FIG. 9 is a cross-sectional view illustrating a state in which pressure pulsation is attenuated by the second damping device and a discharging flow rate is changed by a variable path. Here, numerals that are the same as those of the drawings illustrated above refer to the same members having the same functions.

Referring to FIGS. 8 and 9, the second damping device 200' according the present embodiment includes a cap member 210 configured to seal a second bore 201, a plunger 220' guided by the cap member 210 and configured to move in a sliding manner, an elastic member 230 configured to elastically support the plunger 220', and a housing 240 configured to support the elastic member 230 and coupled to the cap member 210.

The plunger 220' is elastically supported by the elastic member 230 and slidably provided between the accommodation portion 212 and the housing 240. An upper portion of the plunger 220' is inserted in the accommodation portion 212, a lower portion of the plunger 220' is disposed in the housing 240, and the plunger 220' moves while being pressed by hydraulic pressure of brake oil and pressing the elastic member 230. A variable path 221' is provided at an outer circumferential surface of the plunger 220' in a longitudinal direction of the plunger 220', wherein a width of the variable path 221' decreases in a direction in which brake oil is discharged. More specifically, since a lower portion of the variable path 221' is provided to be in contact with a lower end of the accommodation portion 212 of the cap member 210, an area through which brake oil passes is increased when the plunger 220' moves downward, wherein the brake oil passes through the variable path 221'. In addition, a flange 223' is provided at an outer circumferential surface of the plunger 220' and configured to protrude toward an inner circumferential surface of the housing 240 to guide movement of the plunger 220'. At least one hole 222' is provided in the outer circumferential surface of the plunger 220' so that brake oil flows in a longitudinal direction of the plunger 220'. Accordingly, when a pressure of brake oil is low, the plunger 220' does not move, the brake oil is discharged through a discharging port 241 formed at a lower end of the housing 240 while pressure pulsation is attenuated by the hole 222'.

Meanwhile, when a pressure of brake oil is greater than the elastic force of the elastic member 230, since the plunger 220' slides while pressing the elastic member 230, volume thereof is changed, and thus pressure pulsation is attenuated. Here, since the variable path 221' is moved away from the lower end of the accommodation portion 212 due to the movement of the lower plunger 220, an area through which the brake oil passes is increased, wherein the brake oil passes through the variable path 221'.

Then, an action by which pressure pulsation, which is generated by a pumping action (suctioning and discharging) of the pump 44, is attenuated by the above-described pulsation attenuation device will be described with reference to FIGS. 4 to 7.

Figure 4:
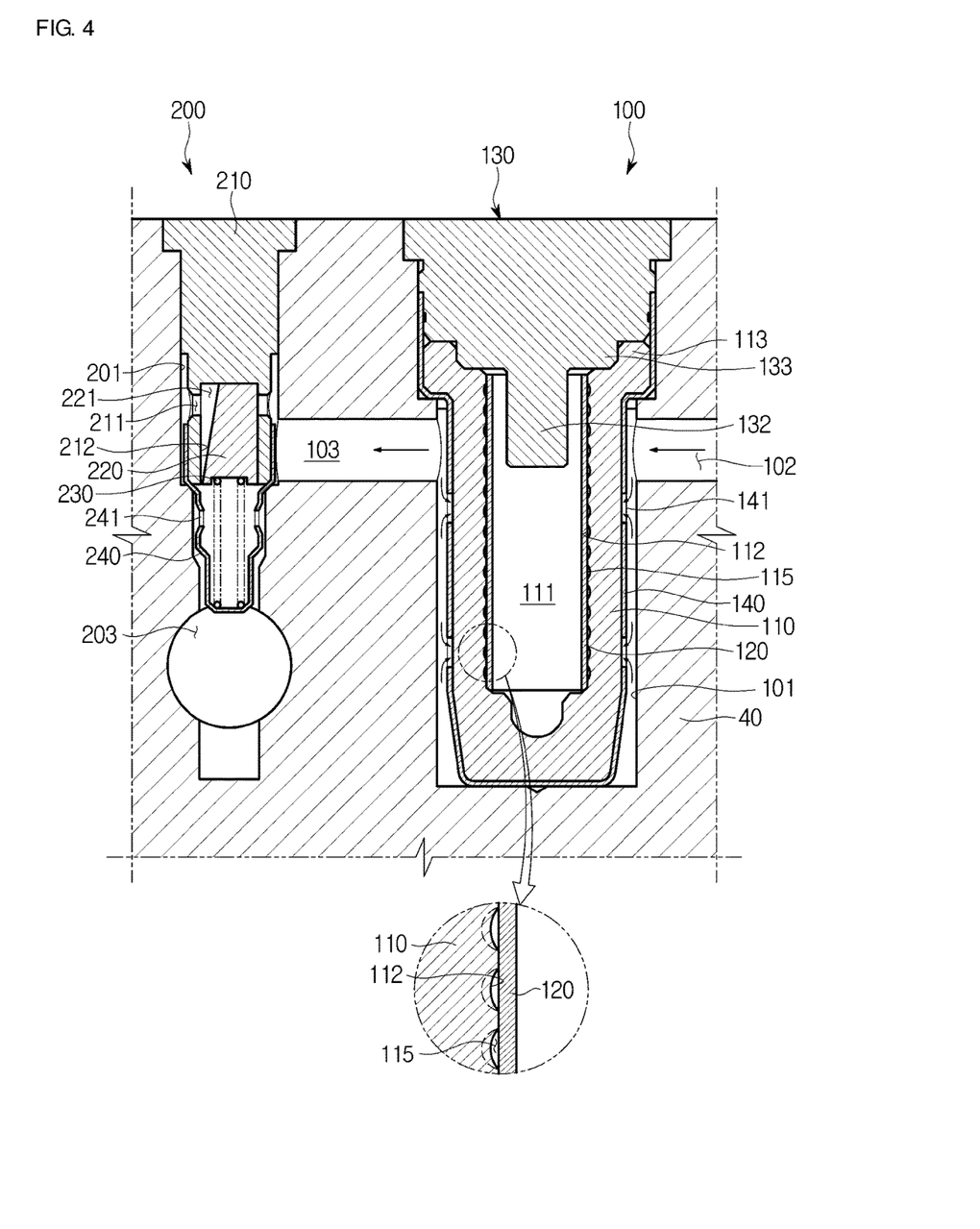
FIG. 4 and FIG. 5 are cross-sectional views illustrating a state in which pressure pulsation is attenuated by the first damping device of the pulsation attenuation device according to one embodiment of the present disclosure.

First, as illustrated in FIG. 4, brake oil discharged by the pump 44 (see FIG. 1) is delivered to the first damping device 100 installed in the first bore 101 through the in-port 102. Since the brake oil introduced through the in-port 102 presses the first damping member 110 through the plurality of holes 141 formed in the sleeve 140, the first damping member 110 is elastically deformed. Here, shock is buffered because the first damping member 110 is made of a rubber material, and pressure pulsation is also effectively attenuated by the damping space 115 formed inside the first damping member 110.

Figure 5:
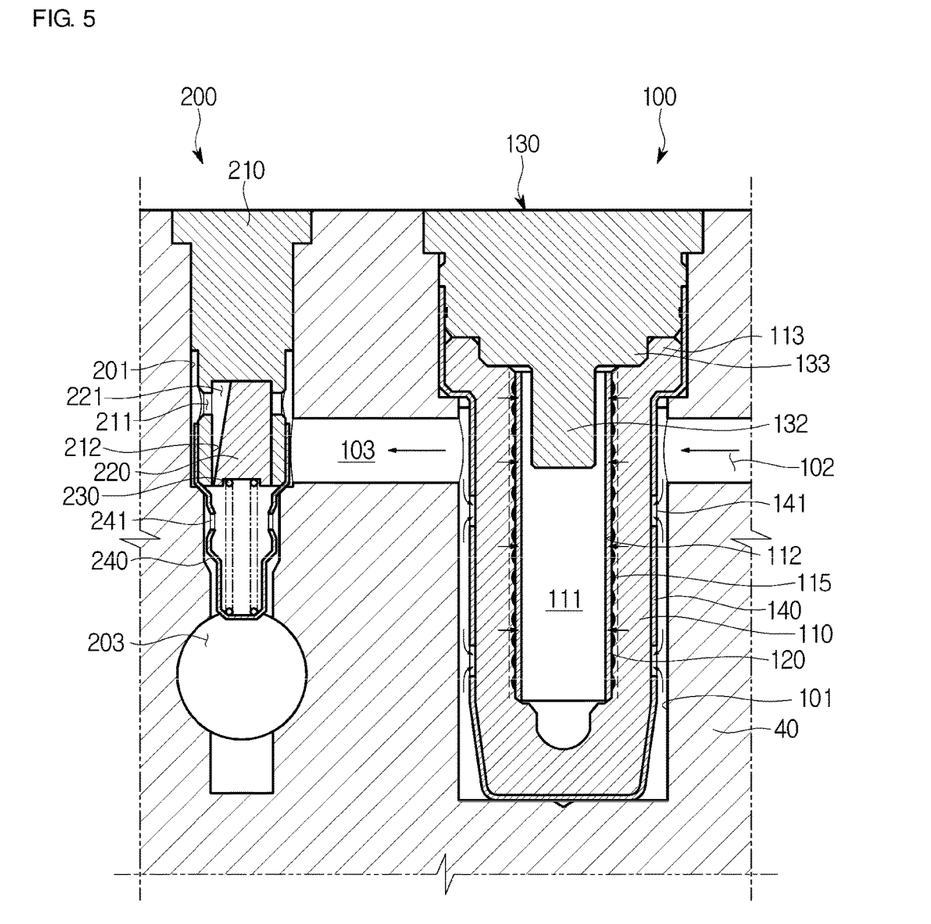

Meanwhile, when a pressure of brake oil introduced through in-port 102 is higher than a predetermined pressure, the second damping member 120 is elastically deformed, and thus pressure pulsation may be further attenuated. Here, the pressure greater or equal to the predetermined pressure denotes a pressure which, for example, increases beyond that during general braking, due to sudden braking or a pressure boosting control mode of the brake system. That is, as illustrated in FIG. 5, the first damping member 110 is primarily elastically deformed by the pressure of brake oil to attenuate pressure pulsation, and when an amount of elastic deformation of the first damping member 110 increases to be equal to or more than a predetermined amount, the second damping member 120 is pressurized and elastically deformed by the first damping member 110, and thus the pressure pulsation is further attenuated. Here, a deformation range of the second damping member 120 may be limited by the stopper 132 of the sealing member 130.

When the above-described first damping device 100 is described by being divided into a low pressure and a high pressure states, the first damping device 100 is described as having the second damping member 120 be elastically deformed to attenuate pressure pulsation when the first damping device 100 is at the high pressure but is not limited to the high pressure state. Even during general braking, the first damping device 100 has to be understood as having the first and second damping members 110 and 120 be elastically deformed to attenuate pressure pulsation.

Brake oil, which passes through the first damping device 100, flows to the second bore 201 through the out-port 103, and the pressure pulsation is further attenuated by the second damping device 200 provided in the second bore 201.

Referring to FIG. 6, when brake oil is introduced through the inlet 211 of the cap member 210, pressure pulsation is attenuated by the variable path 221 between the accommodation portion 212 and the plunger 220, and the brake oil is discharged through the discharging port 241 in the housing 240. Here, since a pressure of the brake oil introduced through the inlet 211 is low and less than the elastic force of the elastic member 230, the brake oil flows through the variable path 221 in a state in which the plunger 220 is not moved.

Meanwhile, when a pressure of brake oil is greater than the elastic force of the elastic member 230, since the plunger 220 presses the elastic member 230 and moves in a sliding manner as illustrated in FIG. 7, a volume thereof is changed, and thus pressure pulsation is attenuated. In addition, an area through which the brake oil passes is increased by the movement of the plunger 220, wherein the brake oil passes through the variable path 221 formed between the plunger 220 and the accommodation portion 212. Accordingly, since a passing flow rate of the brake oil is increased, pressure boosting performance can be improved. That is, a discharging flow rate is changed by the variable path 221 of the second damping device 200 according to low pressure control and high pressure control to minimize flow loss, and thus pressure boosting performance can be improved and pressure pulsation can be attenuated.

As described above, although the pulsation attenuation device provided in the brake system is illustrated and described to include the first damping device 100 and the second damping device 200, the damping devices 100 and 200 may be independently provided in and used for the brake system. Accordingly, when only the second damping device 200 is independently used, the second damping device 200 is installed to receive hydraulic pressure transmitted from the pump 44 (see FIG. 1) to attenuate pressure pulsation. In addition, when the first and second damping devices 100 and 200 are provided together, although it is illustrated that hydraulic pressure is transmitted to the second damping device 200 through the first damping device 100, positions of the first damping device 100 and the second damping device 200 may also be reversed such that the hydraulic pressure is transmitted to the first damping device 100 through the second damping device 200.

As is apparent from the above description, in addition to attenuating pressure pulsation by providing a pulsation attenuation device in which a first damping device and a second damping device are independently or integrally formed, a brake system according to one embodiment of the present disclosure has the effect of effectively attenuating pressure pulsation by further performing a damping action using the first damping device.

In addition, there are effects in that flow loss is minimized and pressure boosting performance is improved by the second damping device by changing a flow rate of discharged oil even when an amount and a flow rate of brake oil are abruptly changed. In addition, since an area of a variable path through which oil passes varies according to movement of a plunger, a pressure change is induced by a change in the speed of the brake oil, and thus the pressure pulsation can be effectively attenuated.

As described above, although the present disclosure has been shown and described with respect to a few specific embodiments and drawings, those skilled in the art should appreciate that various modifications and changes may be made in the technical concept of the present disclosure, the scope of which is defined in the claims and their equivalents.

[Reference Numerals]

| | |
|---|---|
| 100: FIRST DAMPING DEVICE | 101: FIRST BORE |
| 110: FIRST DAMPING MEMBER | 111: HOLLOW |
| 112: GROOVE | 115: DAMPING SPACE |
| 120: SECOND DAMPING MEMBER | 130: SEALING MEMBER |

-continued

[Reference Numerals]

| | |
|---|---|
| 140: SLEEVE | 141: HOLE |
| 200: SECOND DAMPING DEVICE | 201: SECOND BORE |
| 210: CAP MEMBER | 211: INLET |
| 212: ACCOMMODATION PORTION | 220: PLUNGER |
| 221: SLOT (VARIABLE PATH) | 230: ELASTIC MEMBER |
| 240: HOUSING | 241: DISCHARGING PORT |

What is claimed is:

1. A brake system comprising a pulsation attenuation device configured to attenuate pressure pulsation of brake oil discharged from a pump,
wherein the pulsation attenuation device includes a first damping device,
wherein the first damping device includes:
a first damping member inserted into a first bore in communication with an in-port through which brake oil is introduced and an out-port through which brake oil is discharged and having a hollow formed therein;
a second damping member inserted into the hollow to form a damping space between the second damping member and an inner circumferential surface of the first damping member; and
a sealing member coupled to the first damping member and configured to seal the first bore,
wherein the damping space is formed by a plurality of grooves formed in the hollow of the first damping member, and
wherein the second damping member comprises a leaf spring to be elastically deformable and the second damping member has a rolled shape and is positioned in the hollow such that both ends of the second damping member overlap each other.

2. The brake system of claim 1, further comprising a sleeve configured to cover the first damping member and coupled to the sealing member by press-fitting,
wherein a plurality of holes are formed in an outer circumferential surface of the sleeve so that the first damping member is pressurized by the brake oil.

3. The brake system of claim 1, wherein:
a coupler having a step is formed at an upper end of the first damping member; and
an end step fitted to the coupler is formed at the sealing member to be coupled to the coupler by press-fitting.

4. The brake system of claim 1, wherein:
a stopper is formed to extend from a lower end of the sealing member to be inserted into the hollow; and
the stopper is provided to be spaced a predetermined distance from the second damping member to limit a deformation range of the second damping member.

5. The brake system of claim 1, wherein the first damping member is formed of a rubber material to be elastically deformable.

6. The brake system of claim 1, wherein the plurality of grooves are formed in a longitudinal direction of the first damping member and spaced a predetermined distance from each other in an inner circumferential surface of the first damping member or formed in a circumferential direction of the first damping member and spaced a predetermined distance from each other in a longitudinal direction of the first damping member.

7. A brake system comprising a pulsation attenuation device configured to attenuate pressure pulsation of brake oil discharged from a pump, wherein the pulsation attenuation device includes a second damping device installed in a second bore in communication with an in-port through which brake oil is introduced and an out-port through which brake oil is discharged, wherein the second damping device includes:

a cap member configured to seal the second bore and including an inlet through which brake oil is introduced and an accommodation portion in communication with the inlet formed therein;

a plunger provided to be slidable in the accommodation portion;

an elastic member configured to elastically support the plunger; and a housing configured to support a lower end of the elastic member and coupled to the cap member, wherein a width of a space formed between the accommodation portion and the plunger varies in a direction in which brake oil flows to form a variable path between the plunger and the accommodation portion, and wherein a slot is formed in an outer circumferential surface of the plunger, and a width of the slot varies in the direction in which the brake oil flows.

8. The brake system of claim 7, wherein the width of the space formed between the accommodation portion and the plunger is decreased in a direction in which brake oil is discharged.

9. The brake system of claim 7, wherein, when a hydraulic pressure of brake oil introduced through the inlet is a predetermined pressure or more, the plunger is provided to move while pressing the elastic member, and an area through which brake oil flow varies according to the movement of the plunger.

10. The brake system of claim 7, wherein the plunger has a shape corresponding to the accommodation portion and is guided by the accommodation portion.

11. The brake system of claim 7, wherein the accommodation portion is formed by opening a lower portion of the cap member, and the inlet is formed around the cap member to communicate with the accommodation portion.

12. The brake system of claim 7, wherein the inlet is positioned above the housing.

13. The brake system of claim 7, wherein a discharging port through which brake oil discharged through the variable path is discharged is formed in the housing.

14. A brake system comprising a pulsation attenuation device configured to attenuate pressure pulsation of brake oil discharged from a pump, wherein the pulsation attenuation device includes:

a first damping device having:

a first damping member inserted into a first bore configured to communicate with an in-port through which brake oil is introduced and an out-port through which brake oil is discharged and including a hollow in which a plurality of grooves are formed;

a second damping member inserted into the hollow so that the plurality of grooves of the first damping member are formed as a damping space;

a sealing member coupled to the first damping member and configured to seal the first bore; and a sleeve including a plurality of holes formed in an outer circumferential surface thereof, configured to cover the first damping member, and coupled to the sealing member by press-fitting so that the first damping member is pressurized by the brake oil; and a second damping device having:

a cap member configured to seal a second bore in communication with the out-port and having an inlet through which brake oil is introduced from the first damping device and an accommodation portion in communication with the inlet;

a plunger installed to be slidable in the accommodation portion;

an elastic member configured to elastically support the plunger; and a housing configured to support a lower end of the elastic member and coupled to the cap member, wherein a variable path is formed between the plunger and the accommodation portion, wherein the variable path attenuates pressure pulsation of the brake oil introduced through the first damping device and controls a passing flow rate according to a pressure of the brake oil.

15. The brake system of claim 14, wherein a width of a space formed between the accommodation portion and the plunger varies in a direction in which brake oil flows.

16. The brake system of claim 14, wherein a slot is formed in an outer circumferential surface of the plunger, and a width of the slot varies in the direction in which the brake oil flows.

* * * * *